United States Patent
Choi et al.

(10) Patent No.: US 6,605,894 B2
(45) Date of Patent: Aug. 12, 2003

(54) FIELD EMISSION DEVICES USING CARBON NANOTUBES AND METHOD THEREOF

(75) Inventors: Sung Yool Choi, Taejon (KR); Kyoung Ik Cho, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 110 days.

(21) Appl. No.: 09/871,992

(22) Filed: May 31, 2001

(65) Prior Publication Data

US 2002/0067114 A1 Jun. 6, 2002

(30) Foreign Application Priority Data

Dec. 5, 2000 (KR) ............................................. 00-73421

(51) Int. Cl.[7] .............................. H01J 1/62; H01J 1/02; H01J 9/00
(52) U.S. Cl. ..................... 313/495; 313/496; 313/309; 313/310; 445/24; 445/51
(58) Field of Search ................................. 313/495–497, 313/494, 309, 310, 326, 336, 346 R, 311, 351; 445/50, 51, 24; 427/77, 78, 249.1, 903

(56) References Cited

U.S. PATENT DOCUMENTS

| | | | |
|---|---|---|---|
| 5,578,901 A | 11/1996 | Blanchet-Fincher et al. ..... | 313/496 |
| 5,726,524 A | 3/1998 | Debe .......................... | 313/309 |
| 6,277,318 B1 * | 8/2001 | Bower et al. ................ | 264/346 |
| 2002/0031972 A1 * | 3/2002 | Kitamura et al. .............. | 445/3 |
| 2002/0060514 A1 * | 5/2002 | Nakamoto ................... | 313/311 |
| 2002/0060516 A1 * | 5/2002 | Kawate et al. ............. | 313/495 |
| 2002/0113544 A1 * | 8/2002 | Lee et al. .................... | 313/496 |
| 2002/0175617 A1 * | 11/2002 | Lee et al. .................... | 313/495 |

OTHER PUBLICATIONS

Wang, Q.H. et al., "A Nanotube–Based Field–Emission Flat Panel Display," *Applied Physics Letters*, 72(22):2912–2913, Jun. 1, 1998.

* cited by examiner

Primary Examiner—Nimeshkumar D. Patel
Assistant Examiner—German Colón
(74) Attorney, Agent, or Firm—Seed IP Law Group PLLC

(57) ABSTRACT

A field emission device using carbon nanotubes grown in a direction parallel to a substrate and a method of manufacturing a high definition field emission display using an edge emitting luminescent thin film. The device includes a process of selectively depositing a metal catalyst on a sidewall of the pattern to grow the carbon nanotube in a direction parallel to the metal catalyst and a process of attaching the grown carbon nanotube on the main board by application process, so that it can be freely applied in a subsequent process. The device employs a carbon nanotube field emission emitter and an edge emitting in a high fine luminescent body deposited in a thin film type. Thus, a close relationship with the substrate can be maintained due to the horizontally grown carbon nanotubes, a subsequent semiconductor process can be freely applied using a thin film type luminescent body, and a high fine field emission display can be thus manufactured.

9 Claims, 3 Drawing Sheets

FIELD EMISSION DEVICES USING CARBON NANOTUBES AND METHOD THEREOF

TECHNICAL FIELD

The invention relates generally to a field emission device using carbon nanotubes. More particularly, the present invention relates to a vacuum field emission device using carbon nanotubes grown in a direction parallel to a substrate.

BACKGROUND OF THE INVENTION

Emission of electrons in the field emission device is greatly varied depending on the structure of a device, the materials constituting a cathode and the shape of the cathode. Presently, the structure of the field emission device may be classified into a diode type consisted of a cathode and an anode, and a triode type consisted of a cathode, a gate and an anode. The triode type structure can be driven with low voltage compared to the diode type since it applies an electric field to the cathode and its neighboring gate in order to emit electrons. Further, the triode type can control easily the current applied into its gate as well as anode. However, there is a problem that the manufacturing of the triode type is not easy due to its complicated structure.

The materials constituting the cathode include a metal, silicon, diamond, diamond like carbon, carbon nanotube, etc. If the carbon nanotube is used as the cathode materials, a good field emission device could be obtained due to a high field emission characteristic and a high chemical and mechanical stability of the carbon nanotubes. If a field emission device is manufactured using the carbon nanotubes as the cathode, it can be easily applied to a microwave vacuum device, a flat display device, etc.

The field emission device using the carbon nanotube emitter, which has been attempted so far, employs a field emission emitter. The field emission emitter is manufactured by a process in which carbon nanotube is grown using arc discharge or laser vaporization method and then coated it on a substrate using a thick film process, or a process in which after depositing catalyst metal on a main board, the carbon nanotubes are grown in a vertical direction to the main board. In case of the latter, it is possible to manufacture the device using a semiconductor process. However, as the carbon nanotubes grown randomly are irregular in length, it is difficult to make uniform device. Also, there exists a problem in a vacuum packaging peculiar to the conventional field emission display. Further, there is a problem in the adhesion stability of the tube since the structure of the device becomes three-dimensional. In addition, there is a problem that application to subsequent semiconductor processes is made difficult due to existence of a space between the tubes.

SUMMARY OF THE INVENTION

The present invention provides a method of manufacturing a field emission display using an edge emitting for improving subsequent semiconductor processes, in a way that a metal catalyst is selectively deposited at the side walls of the pattern so that carbon nanotubes can be grown in a direction parallel to the catalyst metal and the grown carbon nanotubes are attached on a basic material by a coating process.

According to the present invention, a field emission device using carbon nanotubes is disclosed, including a non-conductive substrate 110 acting as a basic material, a cathode electrode 151 formed on the non-conductive substrate 110, a transparent upper plate 180 and an anode electrode is characterized in that it comprises an insulating layer 140 stacked on a portion of the cathode electrode 151, for electrically isolating the cathode electrode 151 from the anode electrode, the portion neighboring to the anode electrode on the an upper portion of the cathode electrode 151; a conductive metal catalyst 120 coated at least at a portion of sidewall opposite to the anode electrode on the sidewall of the insulating layer 140; and a carbon nanotube emitter 130 grown in the direction parallel to the non-conducting substrate 110 from the surface of the metal catalyst 120, wherein the metal catalyst 120 electrically connects the carbon nanotube emitter 130 and the cathode electrode 151.

Also, a method of manufacturing a field emission device using carbon nanotubes is disclosed that includes the steps of forming a cathode electrode 151 on a non-conductive substrate 110 acting as a basic material through patterning; forming an insulating layer 140 for an electrical isolation on the cathode electrode 151 while exposing a portion of the cathode electrode 151; selectively coating a metal catalyst 120 on the exposed portion of the cathode electrode 151 at one side wall of the insulating layer 140; growing at least one carbon nanotube emitter 130 adhered to the metal catalyst 120 and in a direction parallel to the non-conductive substrate 110; and forming a fluorescent thin film 160 at a point spaced by a given distance with the carbon nanotube emitter 130 on the non-conductive substrate 110.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

A field emission device using carbon nanotubes and method thereof according to one embodiment of the present invention will be described in detail with reference to accompanying drawings.

Figure 1:
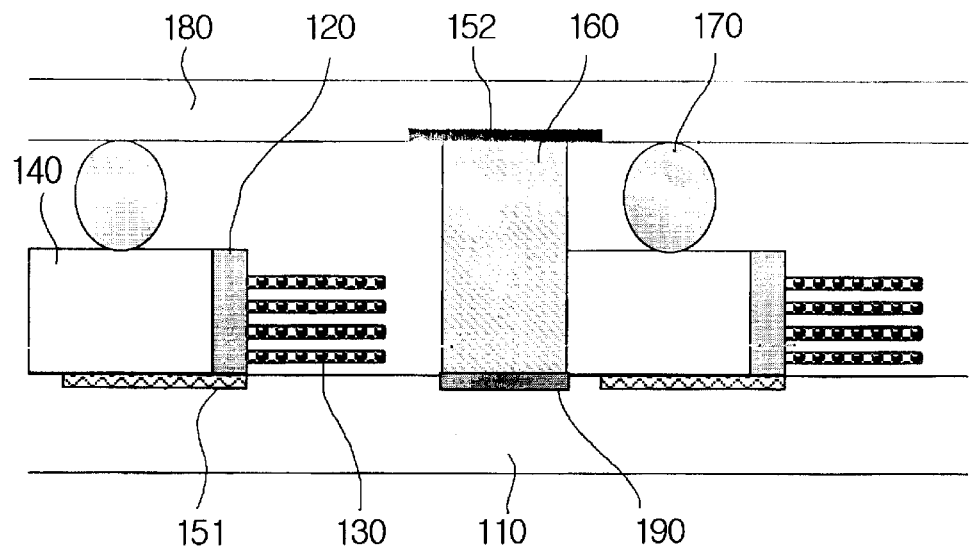
FIG. 1 is a simplified view of a diode-type emission device using carbon nanotubes as an emitter and using a fluorescent thin film as an anode according to one embodiment of the present invention.

FIG. 1 shows a simplified structure of a diode-type emission device using carbon nanotubes as an emitter and using a fluorescent thin film as an anode according to one embodiment of the present invention.

The field emission device shown in FIG. 1 comprises an insulating substrate 110, a cathode electrode 151 an anode 160, an insulating layer 140 for electrically isolating the cathode electrode 151 and the anode 160 neighboring to the cathode electrode 151, and carbon nanotube emitter 130 grown parallel to the substrate 110. If the device is packaged, it may be used as a cathode driving field emission device.

Also, the anode 160 uses a fine-patterned fluorescent thin film. If a spacer 170 for maintaining vacuum, a transparent electrode 152 and a transparent upper plate 180 are packaged in vacuum, a field emission display can be implemented. At this time, as fluorescent material excited by field emission electrons is confined by difference in refractive index between media, an edge emitting phenomenon is generated in a vertical direction than a horizontal direction to the substrate, thereby accomplishing a high efficiency characteristic of the emitting light. This is because the fluorescent thin film acts as a waveguide of the emitting light as well as the fluorescent materials. Also, in order to increase light efficiency in a vertical direction to the substrate, a method, by which a reflecting layer 190 may be deposited on the substrate before the fluorescent thin film is deposited.

Further, as the distance between the cathode 151 and the anode 160 can be controlled by the length of the grown carbon nanotubes and the pattern, it is possible to manufacture a diode field emission device which can be driven at low voltage.

Meanwhile, the metal catalyst 120 causes a catalyst action in a reaction in which carbon nanotubes are grown, wherein transfer metals such as Ni, Fe, Co, etc. and alloys of them may be used.

Also, the spacer 170 is located between the lower plate and the upper plate, electrically isolates them and acts to prevent contacting the upper plate and the lower plate.

Figure 2:
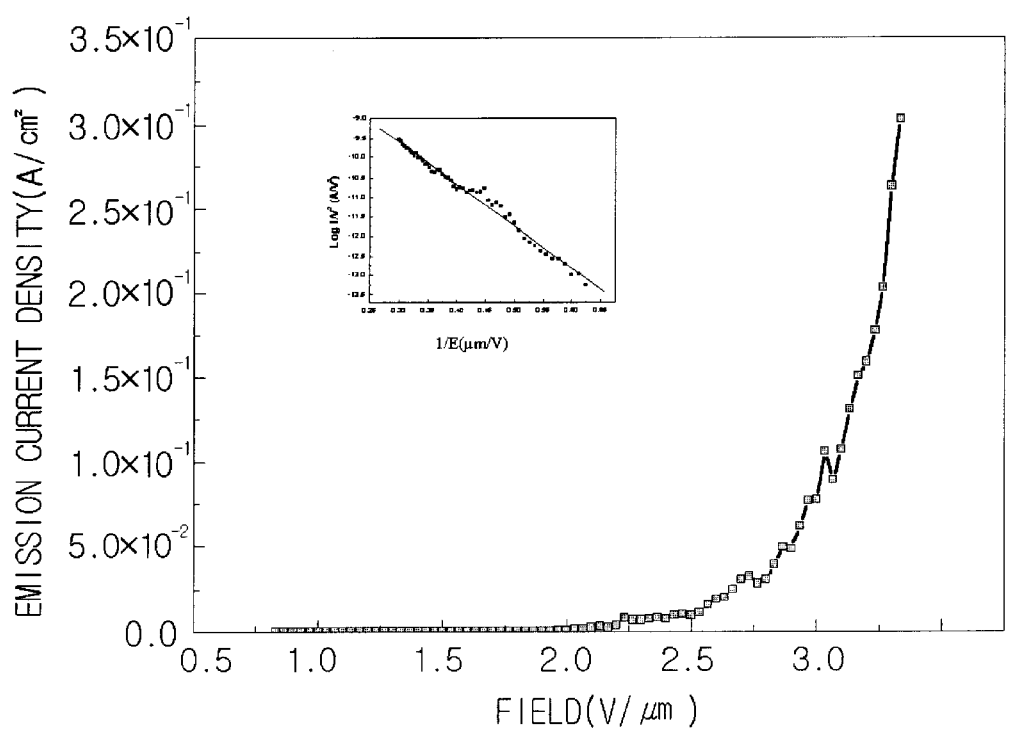
FIG. 2 is a diagram showing a field emission characteristic of the carbon nanotube emitter 130 grown by thermal chemical vapor deposition method in the field emission device shown in FIG. 1.

FIG. 2 is a diagram showing a field emission characteristic of the carbon nanotube emitter 130 grown by thermal chemical vapor deposition method in the field emission device shown in FIG. 1.

As can be seen from FIG. 2, the carbon nanotube emitter 130 is turned on at about 1 V/$\mu$m and represents an emission current of 80 mA/cm$^2$ at about 3V/$\mu$m. That is, in case of the field emission device, as the distance between the carbon nanotube emitter 130 and the anode 160 as a fluorescent material can be freely controlled, when the distance between the two electrodes is maintained at about 1 $\mu$m, it can be driven at about 3 V.

In case of a conventional fluorescent material, the greater the energy of collided electrons is the greater its emitting efficiency. As the distance between the cathode 151 and the emitter 130 is narrower, the energy of electrons to be emitted is low but the high current can be compensated. Also, since the luminescent body acts as a waveguide to the light, loss of the luminescent efficiency due to low voltage can be compensated. Further, in order to increase the light efficiency in a vertical direction, a method may be employed by which the reflecting layer 190 is coated on the substrate 110 before depositing a fluorescent thin film. It is preferred to use as the reflecting layer 190 an aluminum thin film, which is usually employed.

In addition, if the field emission device consisted of the anode electrode 151 separated by a given distance with the carbon nanotube emitter 130 grown horizontally is packaged, this device may be applied to a low-voltage microwave power device which can drive the cathode. Since the carbon nanotube emitter 130 emits electrons at a low voltage, there are advantages that it has a good field emission characteristic and it can be easily manufactured into a cathode driving diode vacuum tube.

FIGS. 3a through 3f are processional cross-sectional views illustrating a method of manufacturing a field emission device according to one embodiment of the present invention.

Figure 3A:
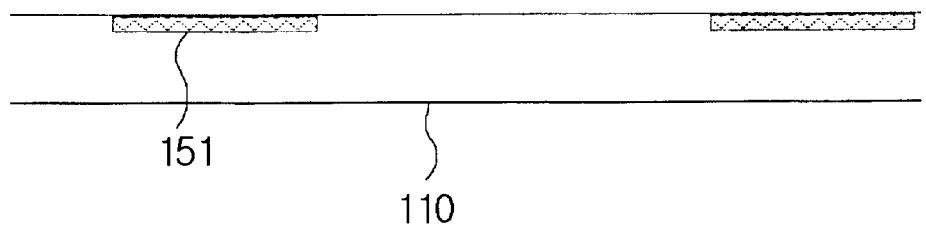
FIGS. 3a through 3f are processional cross-sectional views illustrating a method of manufacturing a field emission device according to one embodiment of the present invention.

As shown in FIG. 3a, the cathode electrode 151 is formed on the basic material (substrate 110) by a patterning process. At this time, the distance between the patterns can be maintained at a desired distance between the cathode and the emitter using a semiconductor process.

Figure 3B:
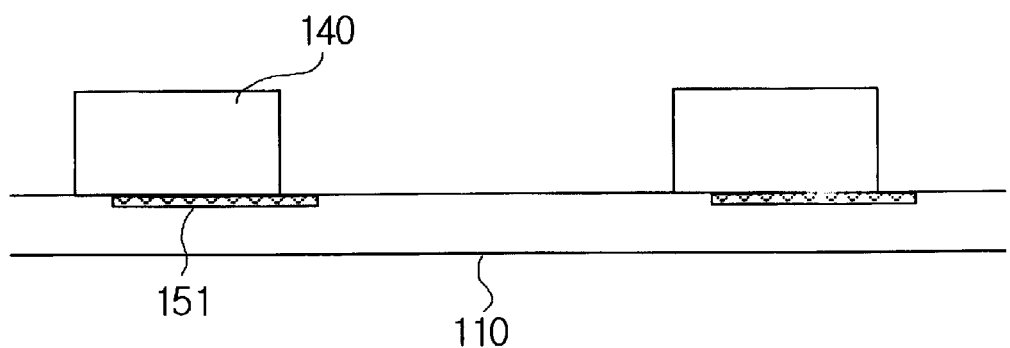

In FIG. 3b, the insulating layer 140 is deposited to expose a portion of the cathode electrode 151.

Figure 3C:
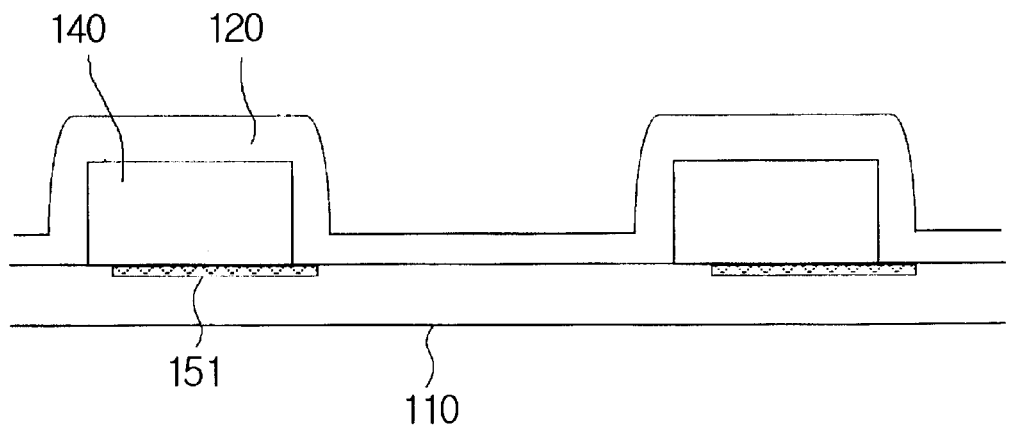
Figure 3D:
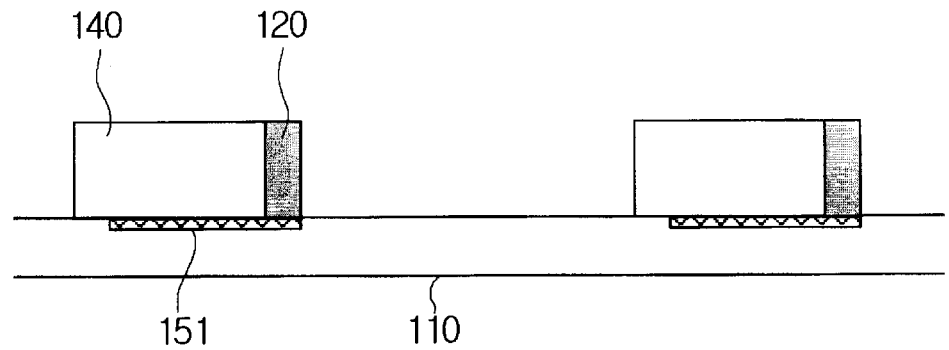

Next, as shown in FIG. 3c, the metal catalyst 120 is entirely deposited on the insulating layer 140 in which the insulating layer 140 and the carbon nanotubes can be selectively grown by the metal catalyst 120. Then, as shown in FIG. 3d, the insulting layer 140 and the carbon nanotubes are etched with only the sidewall of the insulating layer 140 and the metal catalyst 120 on the cathode electrode 151 being left.

Alternatively, the metal catalyst at the sidewall may be selectively coated on one sidewall of the pattern through metal thin film deposition process. In order to selectively deposit the metal catalyst on the sidewall, a metal thin film is first deposited in the thickness of several nanometers, as shown in FIG. 3d and then the metal catalyst is left only at one sidewall through a selective etching process. Alternatively, a glancing angle metal thin film deposition process may be employed.

The metal catalyst 120 manufactured thus makes an electrical contact with the cathode electrode 151 on the substrate 110. At this time, the area of the sidewall can be freely controlled depending on the amount of the current required for the device through patterning process. Meanwhile, the thickness of the sidewall must be several nanometers or fewer so that the carbon nanotubes can be selectively grown at the sidewall in a horizontal direction. If the thickness of the sidewall is thick, as the carbon nanotube can be grown vertically as well as horizontally, it is advantageous to subsequent process that the thickness of the sidewall is thinner.

Figure 3E:
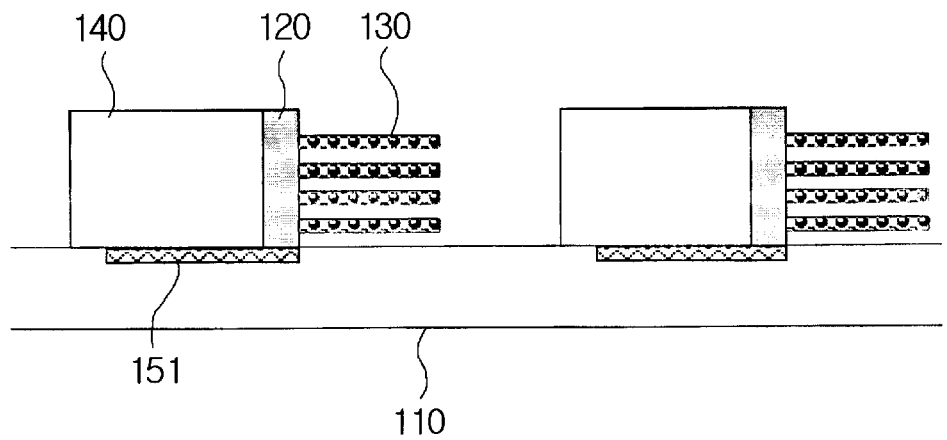

Thereafter, as shown in FIG. 3e, the carbon nanotubes 130 are induced to grow in parallel to the surface of the substrate 110 by thermal chemical deposition method or plasma chemical deposition method. At this time, although the length of the carbon nanotube 130 is irregular, the length can be made regular by growing the carbon nanotubes 130, coating a non-conductive protection film (e.g., silicon-on-glass) and applying lithography and etching processes.

Figure 3F:
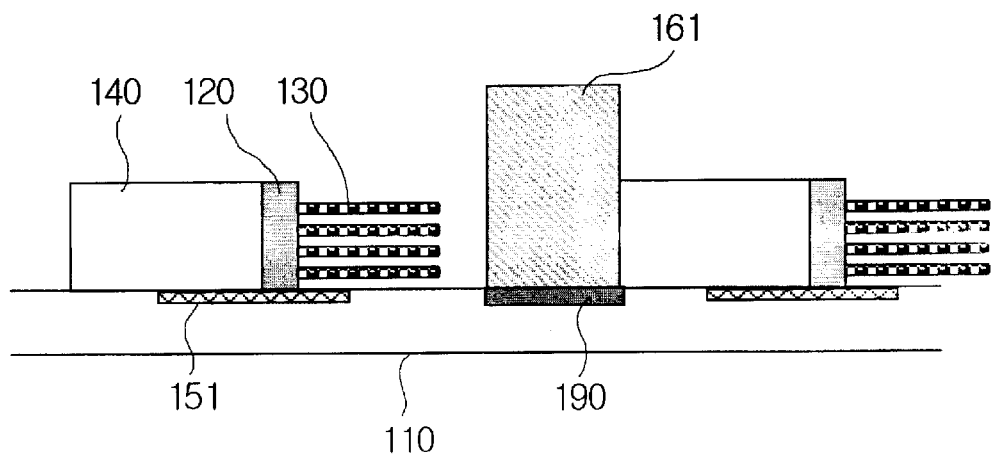

Next, as shown in FIG. 3f, if a semiconductor process is freely applied to manufacture the luminescent thin film 161, the distance between the end of the carbon nanotube 130 cathode and the luminescent body anode electrode can be constantly maintained.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

As mentioned above, in case of a field emission device using carbon nanotubes horizontally grown presented in the present invention, there is an advantage that manufacturing can be made easier since it can employ a conventional semiconductor planar technology without development of additional process technologies.

Further, in case of using a carbon nanotube emitter and a luminescent thin film, there is an advantage that it is possible to manufacture a low voltage driving and high fine emission display.

What is claimed is:

1. A field emission device using a carbon nanotubes, including a non-conductive substrate acting as a basic material, a cathode electrode formed on said non-conductive substrate, a transparent upper plate and an anode electrode, comprising:

an insulating layer stacked on a portion of said cathode electrode, for electrically isolating said cathode electrode from said anode electrode, said portion neighboring to said anode electrode on the upper portion of said cathode electrode;

a conductive metal catalyst coated at least on a portion of sidewall opposite to said anode electrode on the sidewall of said insulating layer; and a carbon nanotube emitter grown in the direction parallel to said non-conductive substrate from the surface of said metal catalyst.

2. The field emission device according to claim 1, wherein said anode electrode comprises a fluorescent thin film formed on a plane parallel to the growth direction of said carbon nanotube emitter.

3. The field emission device according to claim 2, wherein emission of said fluorescent thin film employs an edge emitting.

4. The field emission device according to claim 2, further comprising a reflecting layer formed between said non-conductive substrate and said fluorescent thin film, for increasing the light efficiency in the direction parallel to said non-conductive substrate.

5. The field emission device according to claim 1, further comprising a spacer formed between said insulating layer and said transparent upper plate.

6. A method of manufacturing a field emission device using carbon nanotubes, comprising the steps of:

forming a cathode electrode on a non-conductive substrate acting as a basic material through a patterning process;

forming an insulating layer for an electrical isolation on said cathode electrode while exposing a portion of said cathode electrode;

selectively coating a metal catalyst on the exposed portion of said cathode electrode at one side of said insulating layer;

growing at least one carbon nanotube emitter from said metal catalyst in a direction parallel to said non-conducting substrate; and forming a fluorescent thin film at a point spaced by a given distance with said carbon nanotube emitter on said non-conducting substrate.

7. The method of manufacturing a field emission device according to claim 6, wherein said coating step includes:

entirely depositing a metal thin film on the product resulted from said insulating layer forming step; and selectively forming said metal catalyst using either a selective etching process or glancing angle metal thin film deposition process with a given angle.

8. The method of manufacturing a field emission device according to claim 6, wherein said glowing step includes growing said at least one carbon nanotubes in parallel to the surface of said non-conducting substrate using either a thermal chemical deposition method or plasma chemical deposition method.

9. The method of manufacturing a field emission device according to claim 6, wherein said coating step includes, after said at least one carbon nanotubes is grown, regularizing the length of said at least one carbon nanotubes irregularly grown by coating an insulating protection film and then using lithography and etching processes.

* * * * *